United States Patent [19]

Stallings

[11] 4,353,759

[45] Oct. 12, 1982

[54] PROCESS AND APPARATUS FOR MATCHING INDICIA PANELS AND THE LIKE

[76] Inventor: Glenda L. Stallings, 4398 Arbor Dr., Okemos, Mich. 48864

[21] Appl. No.: 259,452

[22] Filed: May 1, 1981

[51] Int. Cl.[3] .......................... B32B 31/18; G01B 3/14

[52] U.S. Cl. .................................. 156/64; 33/174 G; 33/DIG. 10; 156/94; 156/216; 156/247; 156/267; 156/268; 156/289; 174/66; 220/241; 427/208; 428/40; 428/63; 428/79; 428/134; 428/137; 428/352; 428/354; D10/64

[58] Field of Search .................. 156/64, 94, 289, 247, 156/216, 267, 268; 206/582; 427/208; 428/40, 63, 78, 79, 352, 354, 134, 136, 137; 174/66; 220/241; D10/64; 33/174 G, 147 H, DIG. 10

[56] References Cited

U.S. PATENT DOCUMENTS

| | | | |
|---|---|---|---|
| D. 237,691 | 11/1975 | Black | D10/64 |
| D. 237,692 | 11/1975 | Black | D10/64 |
| D. 238,662 | 2/1976 | Black | D10/64 |
| D. 238,761 | 2/1976 | Black | D10/64 |
| D. 238,762 | 2/1976 | Black | D10/64 |
| D. 242,903 | 1/1977 | Benoit | D10/64 |
| D. 242,904 | 1/1977 | Benoit | D10/64 |
| 3,499,102 | 3/1970 | Gillemot et al. | 174/66 X |
| 3,795,983 | 3/1974 | Gallagher et al. | 33/174 G X |
| 3,930,102 | 12/1975 | Müller et al. | 428/354 |
| 4,259,785 | 4/1981 | Wortham | 33/174 G X |
| 4,312,458 | 1/1982 | Stewart | 220/241 |

*Primary Examiner*—Robert A. Dawson
*Attorney, Agent, or Firm*—Miller, Morriss and Pappas

[57] ABSTRACT

An apparatus comprising a sized and score marked laminar templet, the templet having an outer or upper layer of score marked and sized release paper over a contact adhesive layer and including a lower, lighter weight release paper forming the lower layer of the laminar sandwich. The process is a step-wise use of a laminar templet to achieve a matching registry between covering applied to a cover plate and the background wall covering and where the adhesive inner layer is transferred from the templet and to the piece of wall covering for match. Then the wall covering is adhered to the face of the cover plate to achieve a professional-like match easily and quickly.

2 Claims, 13 Drawing Figures

PROCESS AND APPARATUS FOR MATCHING INDICIA PANELS AND THE LIKE

The present invention is directed to a process and apparatus for matching indicia panels and is more directly related to covering panels with indicia bearing wall covering material so as to achieve a match of the indicia or pattern where panels require covering that matches and registers with the background pattern of wall covering or wallpaper. The panels may be service panels, electrical panels, doors, plates or the like that cover penetrations through walls. Typical are switch plates, outlet boxes, combination switch and outlet covers, fuse box covers and the like.

For decorators and particularly the do-it-yourselfers, the problem of covering such plates, covers or panels with a material having a patterned surface is a very difficult one. Beautiful wall covers look incongruous where mis-match occurs and the time spent in seeking a match is wildly disporportionate to the time of installation of a whole wall. In addition, much wall covering is spoiled in the effort to achieve a reasonably acceptable match. Finally, the decorative effect of blending the covering of the plate with the wall covering design in a harmonious, unbroken manner is much sought after. Accordingly, the present invention seeks to achieve a procedure and structure to facilitate matching and covering of plates to match the background wall covering so as to make professional results easily achievable by all and to speed up the overall job of decorating or redecorating rooms with wall covering. The present invention seeks to do this for standard panel coverings such as wall plates, outlets, switches and the like and to provide blank units for larger or special panels as may be encountered in the covering of walls.

The inventor is unaware of any prior art devices or procedures that are in any wise similar to the process and apparatus herein described.

General Description

Wallpaper and wall coverings, however ornate, if they include pattern, texture or color variation, have patterns that repeat and in running or hanging wallpaper and wall covering, the match repeat is used to register adjacent runs or rolls of covering. Normally, the wall covering is applied to the planar wall and runs over outlet boxes, panels, switches and the like which form discontinuities. Then the cover plates for these panel openings require painting which seeks to match or contrast a background color, or they are covered by the wall covering with some effort toward match. The present invention is addressed to the task of covering the plate or panel with covering material so that there is registry in line, color, texture, or pattern between the cover plate and the wall covering.

The apparatus for matching the sheet-like covering material of cover plates to the background pattern for the wall surface covering is a laminar structure which has an upper sized and scored templet sheet and the templet sheet has a lower release surface. A contact adhesive layer is releasably adhered to the lower release surface of the templet sheet. Then a lower release paper sheet is releasably adhered to the intermediate adhesive layer. This adhesive sandwihch structure, sized and scored, is then the basic element in achieving a quick and easy matching cover for the cover plate, even considering the projection of the plane of the cover forwardly of the wall plane.

The adhesive sandwich apparatus of the present invention is used to achieve matching in the following manner. Apply a piece of wall covering material over the wall and the panel or opening to be covered and match the piece to the existing wall covering or background. Then while holding the piece of wall covering in matching register over the wall plate or panel, mark as by creasing, embossing or indenting, as by a fingernail, the corners, edges or sides of the wall plate while holding the cover piece in position. This crease may be transferred to the back of the wall covering by pencil markings. Then the release paper is removed from one side of the adhesive sandwich and the exposed adhesive surface is pressed into contact with the marked back of the piece of wall covering material. This attaches the templet to the back of the wall covering. Then the covering material is trimmed to correspond to the templet. The wall plate or panel can then be removed from the wall or ceiling surface and the second layer of release paper is then removed with the templet from the back of the wall covering piece and then wall plate face is pressed onto the exposed adhesive layer in accord with the registry marks. The cover material is smoothed into place in contact with the cover plate and the selvedge edges of the covering material is folded around all edges of the cover plate and pressed into openings therethrough. This sticks the edges of the covering material to the back of the cover plate and the cover or wall plate can be replaced and the match to the wall covering background is assured.

IN THE DRAWINGS

Figure 3:
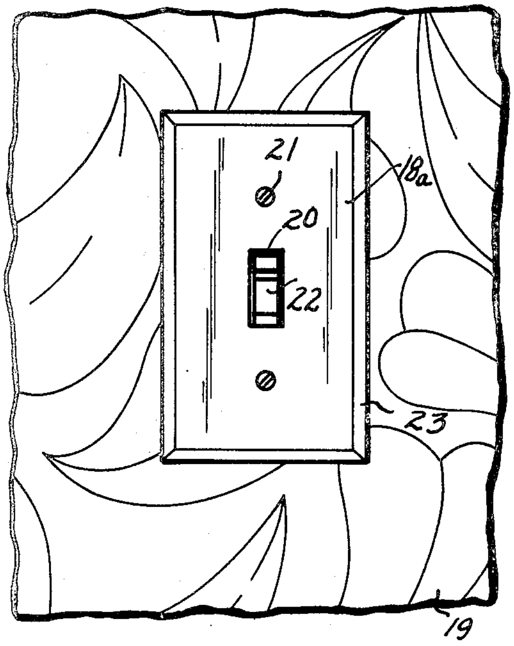
FIG. 3 is a front elevation view of a switch plate cover over a switch in a wall having a patterned wallpaper or wall covering.
Figure 4:
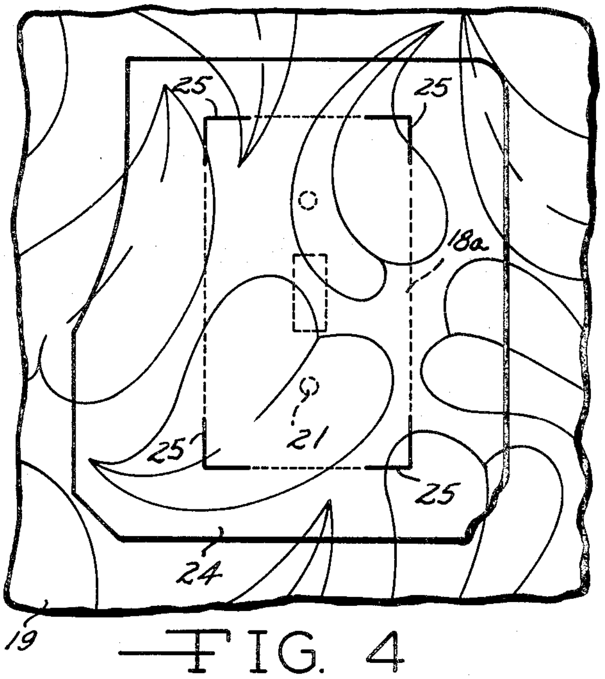

FIG. 4 is the papered wall and switch cover seen in FIG. 3 but with a covering piece or fragment of wall covering overlaying the switch cover and matched in line, design and color with the background pattern. The corners of the plate are marked or embossed by a fingernail or rigid marking element so as to make locating marks on the piece of wall covering. These can be further indicated by pencil on the back of the wall covering.

Figure 5:
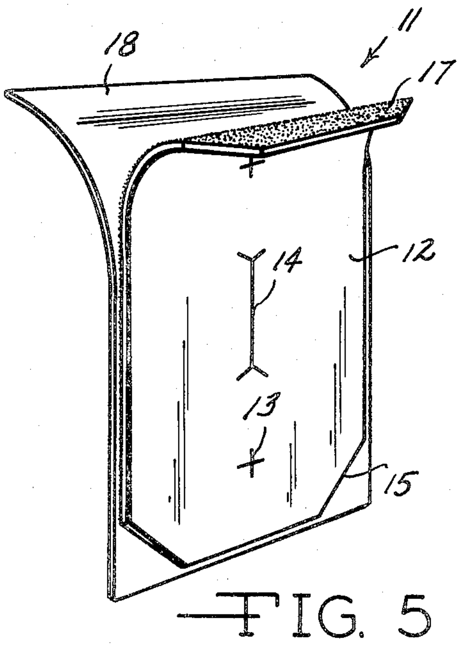

FIG. 5 is a perspective view showing one release layer removed from the laminated templet.

Figure 6:
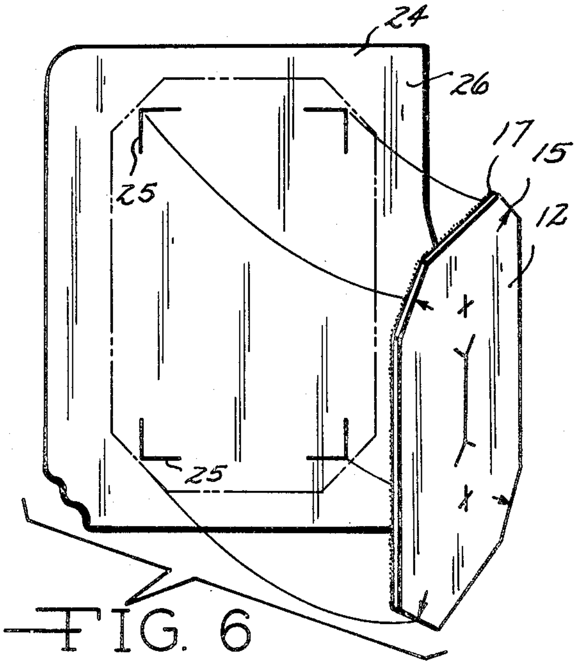

FIG. 6 is an exploded perspective view indicating registry of the templet on the marked back of the piece of covering material.

Figure 7:
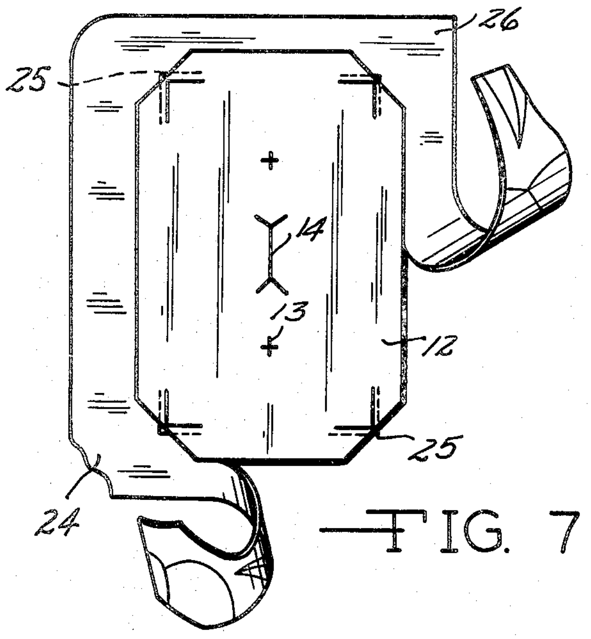

FIG. 7 is a perspective view of the templet adhered by pressing against the marked registry position on the back of the piece of covering material and indicating that the covering material is then trimmed to templet size.

Figure 8:
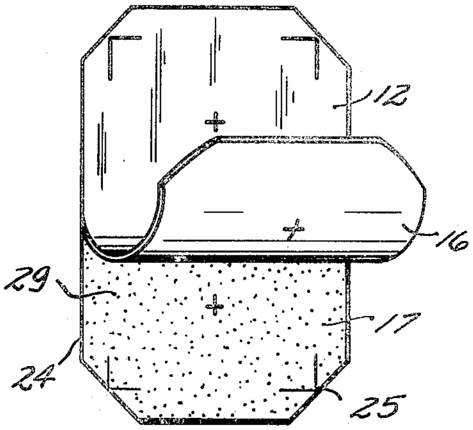

FIG. 8 is a perspective view of the piece of wall covering trimmed to size and with the templet release paper being removed therefrom leaving the adhesive coating exposed on the back of the piece of covering material and the covering material has been scored as indicated by the scoring indicia on the templet unit.

Figure 9:
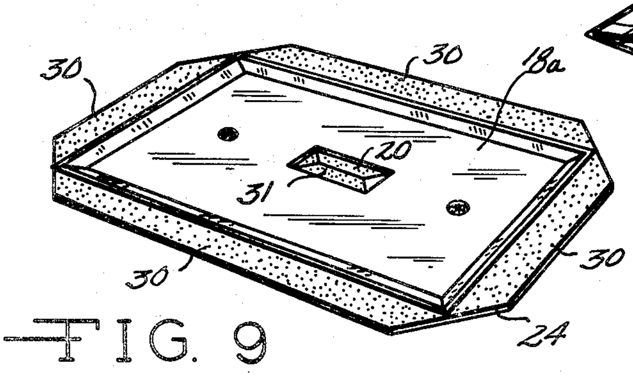

FIG. 9 is a perspective view of the switch cover or wall plate placed face down against the adhesive covered back of the covering material with its corners on the corner locations.

Figure 10:
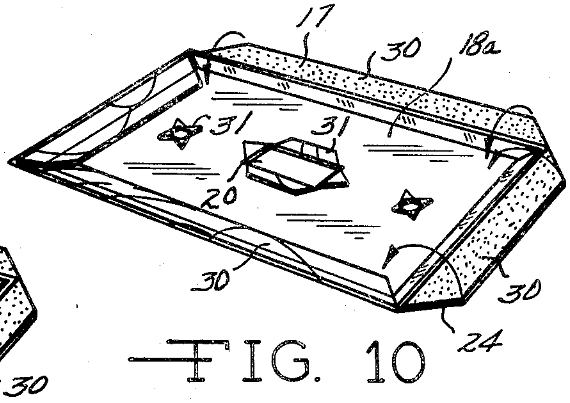

FIG. 10 is a perspective view of the switch plate or cover with the selvedge edges and scored stock being pressed around the corners and edges of the switch plate and through the openings, as shown.

Figure 11:
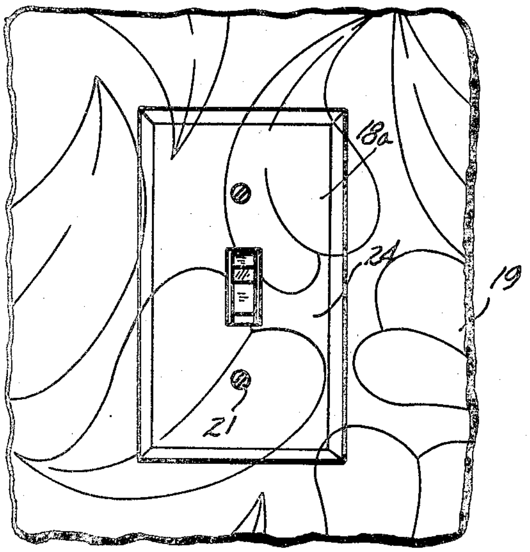

FIG. 11 is a front elevation view of the switch cover as covered with wall covering material and matching the background wall covering in line, design, color, and texture and the switch cover plate reattached to the wall.

Figure 12:
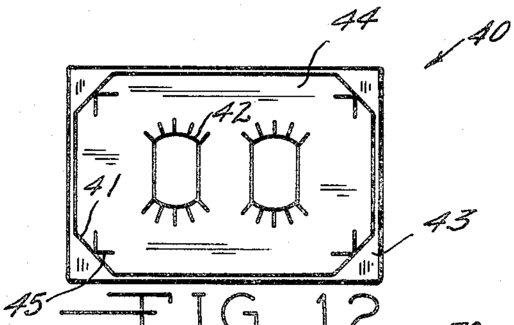

FIG. 12 is a top plan view of a templet in accord with the present invention sized and scored to use with a double outlet cover.

Figure 13:
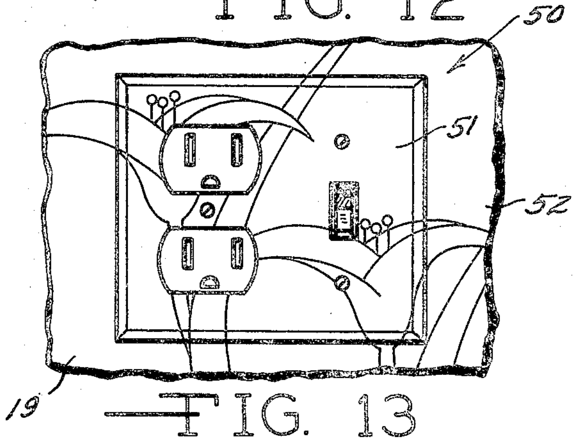

FIG. 13 is a front elevation view of a combination switch and outlet cover matched to the background wall cover in accord with the present invention.

SPECIFIC DESCRIPTION

Figure 1:
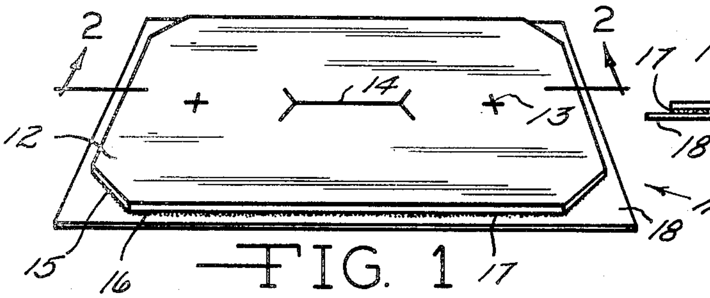
FIG. 1 is a perspective view of a laminar templet in accord with the present invention sized and scored for use with a wall plate for a single switch.
Figure 2:
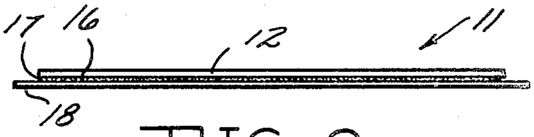
FIG. 2 is a cross section elevation view taken on the line 2—2 of FIG. 1.

Referring to the drawings and with first reference to the FIG. 1. thereof, the laminar apparatus 11 of the present invention is shown as prepared for covering, for example, a standard electrical switch plate. The laminar apparatus 11 includes a templet sheet 12 which is scored and marked, as indicated. The scoring marks 13 are for the fastening screws and the scoring marks 14 are for the access opening for the switch lever or actuator. It will be appreciated that templets 12 are prepared in accord with this description adapted to variations in switch or cover plate size and configuration. The diagonal corner cuts 15 are shaped, as will be seen, to produce a selvedge which can be folded over the edges of the switch or cover plates. The lower side 16 of the templet sheet 12 has a release surface or facing. The lower release surface 16 is removably adhered to contact adhesive layer 17. The contact adhesive layer 17 is covered by a lower release sheet 18 such as treated paper releasably adhered to the lower side of the adhesive layer 17 and thus forms a laminar sandwich construction as viewed in the FIG. 2. A sized and scored laminar apparatus 11 is provided which is selectively activated to expose the adhesive layer 17 by removal of the lower release sheet 18 and the templet 12.

To appreciate the setting of use of the apparatus 11, reference is had to FIG. 3 where a wall switch plate 18*a* is in position over a patterned wall covering or background material 19. The cover plate 18*a* is provided with the typical center opening 20 and is secured in place by the fasteners 21. The wall covering or paper 19 has been applied to the wall, ceiling or other plane surface in the usual manner and matched to adjacent sheets of covering material (not shown) so that the portion covering the switch opening is determined by the match during hanging of the wallpaper 19. The switch lever 22 projects through the opening 20 and as is usual in standard switch plates, there is a marginal bevel portion 23 tapering toward the wall surface and projecting the plate 18*a* outward therefrom for a slight distance. The process of matching background indicia to panels plates and covers by coating must be understood in accord with the present invention.

The problem posed to the paper hanger is how to cover the plate 18*a* so as to achieve a matching register with the adjacent background paper or covering 19. In FIG. 4 a piece or scrap of cover material 24 having the same pattern, color, or design as the wall covering 19 is placed in registry relation to the pattern, color and design of the wall covering 19 and is positioned in that registry. Then, carefully holding the match, the corners of the piece of covering 24 at the edge of the plate 18*a* are marked as by the creasing (using a fingernail or rigid object) and the creases 25 are visible in the FIG. 4. The best procedure is to mark one set of horizontals, holding the match adjacent the edge of the piece of covering material 24 closest the marks. Then hold the edge closest for one of the verticals and mark while maintaining intersection registry at the intersection with the first marking. Similarly advance to the second horizontal marking and thence to the third. This procedure assures utltimate registry of the plate 18*a* against the piece of covering 24 independent of stand-off of the plate 18*a* and lever 22 from the wall surface. As will be seen, the openings 21 and 22 need not be marked. Having thus marked the piece of wall covering 24 whilst registering it against the pattern, color and line of the background or cover 19, the back side 26 of the piece of covering 24 may be marked by pencil as can be seen in FIG. 6 using the creases or embossed-like markings through the material of piece 24. The piece of covering 24 may be momentarily set aside and the laminar apparatus 11 or adhesive sandwich may then be put to use as seen in FIG. 5. The lower release paper sheet 18 is removed from contact adhesive layer 17. This activates and exposes the adherence properties of the adhesive layer 17 and the layer 17 is in dimensional accord with the sizing and scoring 13, 14, 15 of the templet sheet 12.

By referring to FIG. 6, thus activated and exposed, the adhesive 17 on the templet 12 is swung in to registry with the pencil marks 25 on the back 26 of the piece of covering material 24 corresponding to the creases 25 so that the intersections of the marks 25 meet the center points of the diagonal corner truncations 15 (at the arrows). With care the templet 12 and adhered adhesive 17 is pressed into contact with the back 26 of the piece of covering 24, as shown. Thus positioned, the templet 12 is used as a cutting pattern and surplus of the piece of covering material 24 is trimmed away, as seen in FIG. 7, and the score lines at 13 and 14 may be extended through the piece of covering material 24 as by a razor or other sharp blade. As trimmed and scored in the FIG. 8, the templet 12 is now removed from the adhesive layer 17. This is accomplished by reason of the freeing of the release surface 16 on the underside of the templet from the adhesive layer 17. This leaves the trimmed piece of covering 24 with an exposed and adhered adhesive underside 29 derived from the intermediate adhesive layer 17 of the laminar apparatus 11.

In the FIG. 9 the switch plate 18*a* is placed face down in registry on the trimmed and adhesively coated piece of covering material 24. The contact adhesive 17 secures itself to the face of the plate 18*a* with overlap 30, as indicated, and using the marks 25 visible through the adhesive as aids to location of the corners. The openings, such as 20, and the fastener openings for the fasteners 21, having been scored, also provide an internal overlap 31. In FIG. 10 the adhesively coated overlaps 30 and 31 are folded over the edges of the plate 18*a* and the openings therethrough to provide smooth edges from the piece of covering material 24 as seen trimmed and located in FIG. 10.

In FIG. 11 the fasteners 21 are inserted in the wall plate 18*a* and the covered plate 18*a* is fastened in position with the covering material 24 in substantially exact match registry with the indicia printed background wall covering 9.

The FIG. 12 shows a different type of templet apparatus 40 for wal plugs or double electrical outlet box cover. The adhesive sandwich 40 is sized and scored at 41 and 42 to function as previously described. The lower release paper sheet is seen and the templet plate 44 with lower release surface is shown positioned above the lower release sheet 43 and it will be understood that the contact adhesive is intermediate the templet 44 and release sheet 43. The arrows 45 provide assists to accurate location of the templet 44 on the guide markings as previously described.

In FIG. 13 a combination wall plate 50 is shown covered with a piece of wall covering material 51 and matching the background line, pattern, color, or texture established by the background wall covering 52.

Other types and configurations of wall plates can be treated in the same manner as described herein where the apparatus or process of the present invention is the key to rapid and effective registry of coverage to match the underlying wall covering. The invention contemplates the use of new and improved adhesives and release surfaces and the color coding of the templet and lower release sheet. Such variants are well within the contemplation of the invention and are intended to be covered as improvements, changes and modifications within the spirit of the invention and limited only by the scope of my hereinafter appended claims.

I claim:

1. An apparatus for matching a covering material to a background where the covering is to be applied to cover plates comprising:

a laminar structure having an upper sized and scored templet sheet having a lower release surface, said sheet having sized and scored portions defining relief indicia around orifices and edges of selected of said cover plates;

an intermediate contact adhesive layer releasably adhered to said templet sheet; and a lower release paper sheet releasably adhered to said intermediate adhesive layer.

2. A process for matching a cover material to a background where the covering is to be applied to cover plates, the steps of:

covering an existing cover plate with a piece of covering material and adjusting said covering material to match background wall covering material;

marking through said piece of cover material to register positions on said cover plate while holding said match;

applying a pre-scored and sized templet adhesively to said back side of said piece of covering material and locating by registry with said marked positions;

trimming said covering material to templet size and scoring said covering as said templet is scored;

peeling said templet away from said adhesive and exposing said adhesive surface as adhered to the back side of said trimmed covering material;

registering said wall plate to be covered over said exposed adhesive surface in face down relation and pressing said wall plate face against said adhesive using said marked positions for location; and wrapping the surplusage of adhesive backed covering material around the edges of said wall plate in accord with said sizing and scoring for smooth adherence and clean lines around edges and openings whereby upon attaching said covering wall plate to its original position the covering material is in pattern registry with said wall covering the background.

* * * * *

UNITED STATES PATENT OFFICE

CERTIFICATE OF CORRECTION

Patent No. 4,353,759 Dated 1982 October 12

Inventor(s) Glenda L. Stallings

It is certified that error appears in the above-identified patent and that said Letters Patent are hereby corrected as shown below:

Column 1, line 66, "sandwihch" should read --- sandwich ---

Column 4, line 33, "in to" should read --- into ---

Column 5, line 4, "wal" should read --- wall ---

Column 6, line 33, "covering" should read --- covered ---

Column 6, line 35, delete "the" after "covering"

Signed and Sealed this

*Seventh* Day of *December 1982*

[SEAL]

*Attest:*

GERALD J. MOSSINGHOFF

*Attesting Officer* *Commissioner of Patents and Trademarks*